July 17, 1928.  
A. J. GIFFORD ET AL  
1,677,761  
MACHINE FOR MILLING CRANKSHAFT PINS  
Filed June 25, 1924 6 Sheets-Sheet 6
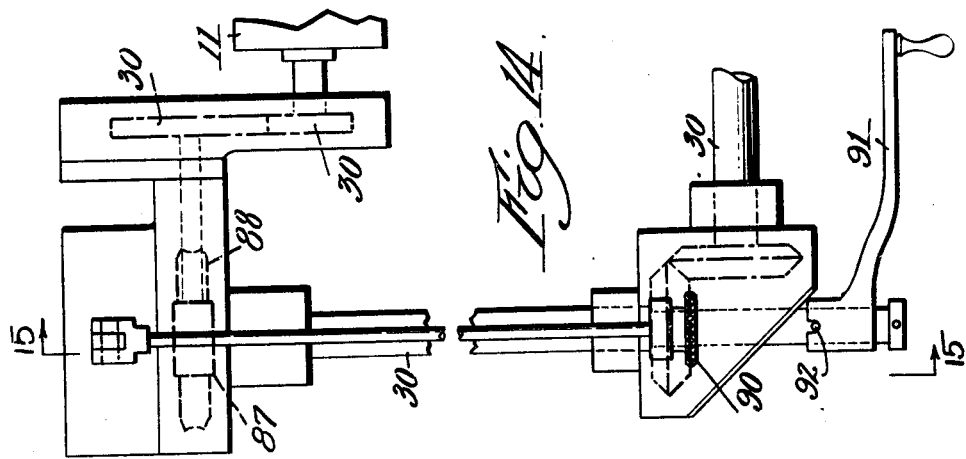
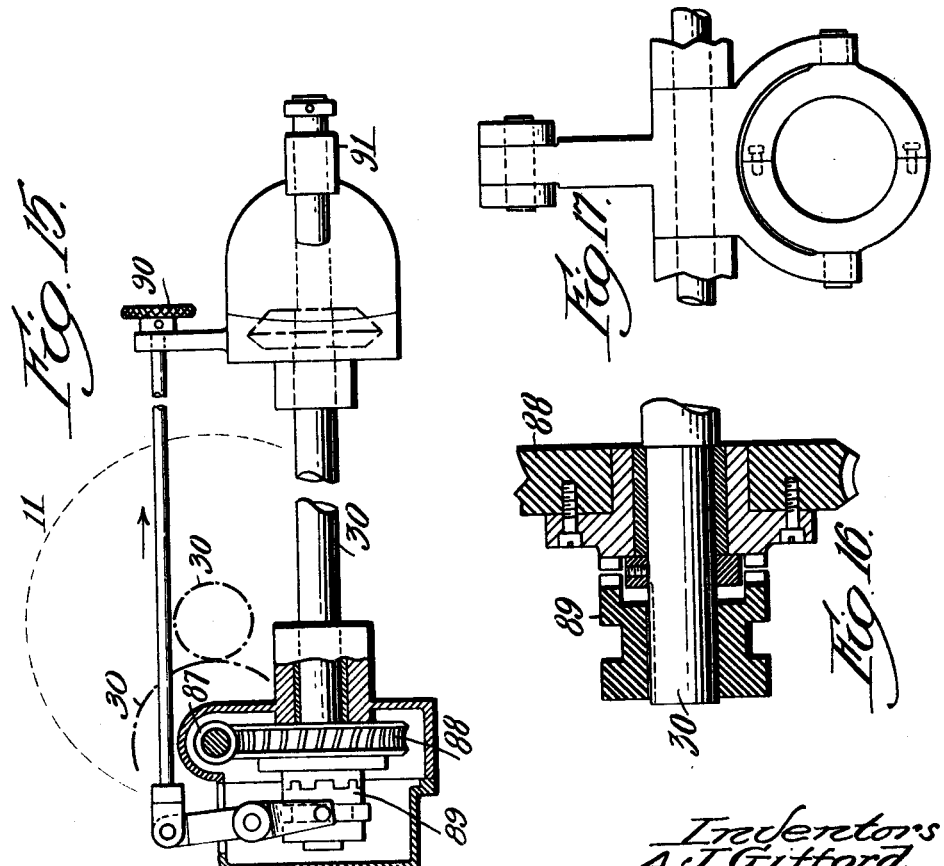
Inventors  
A. J. Gifford  
B. S. T. Bishop.

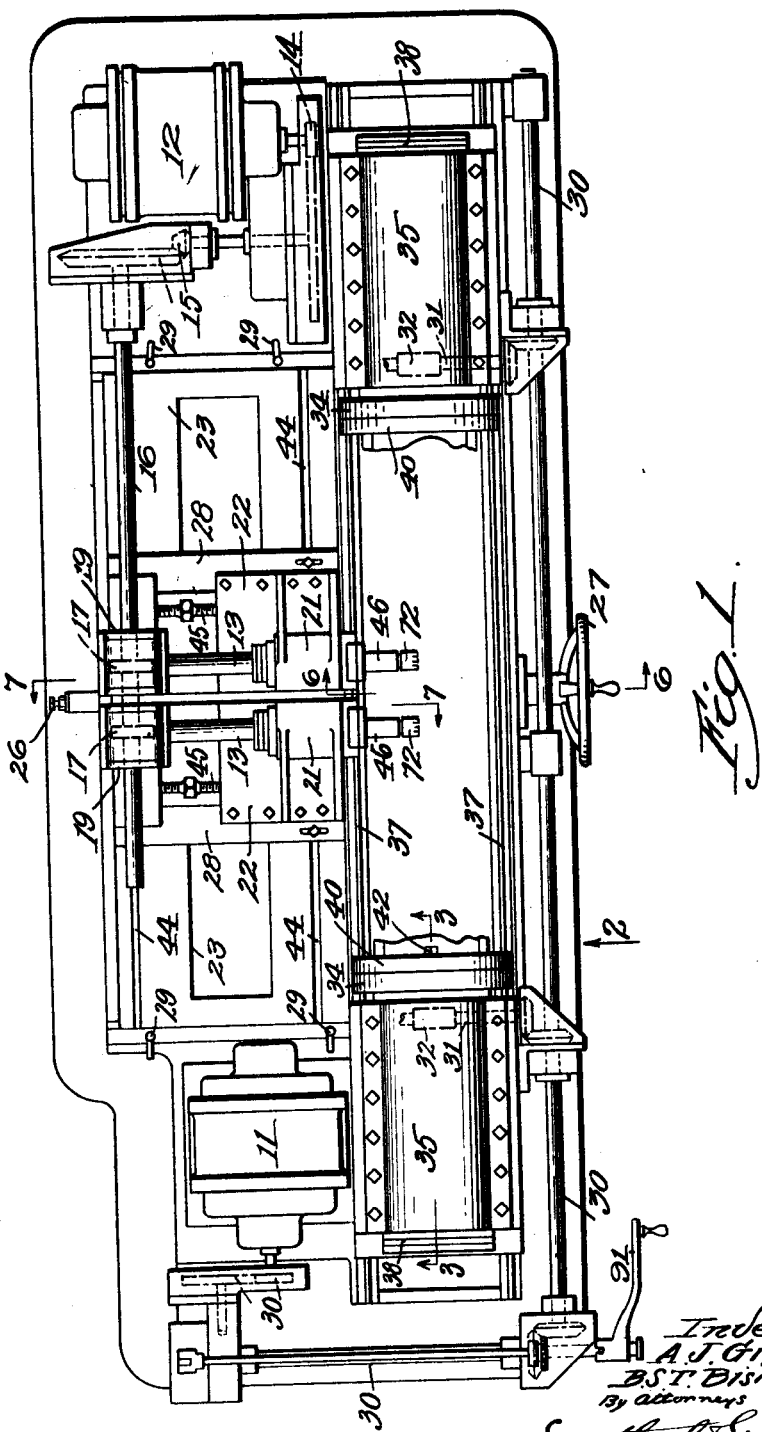

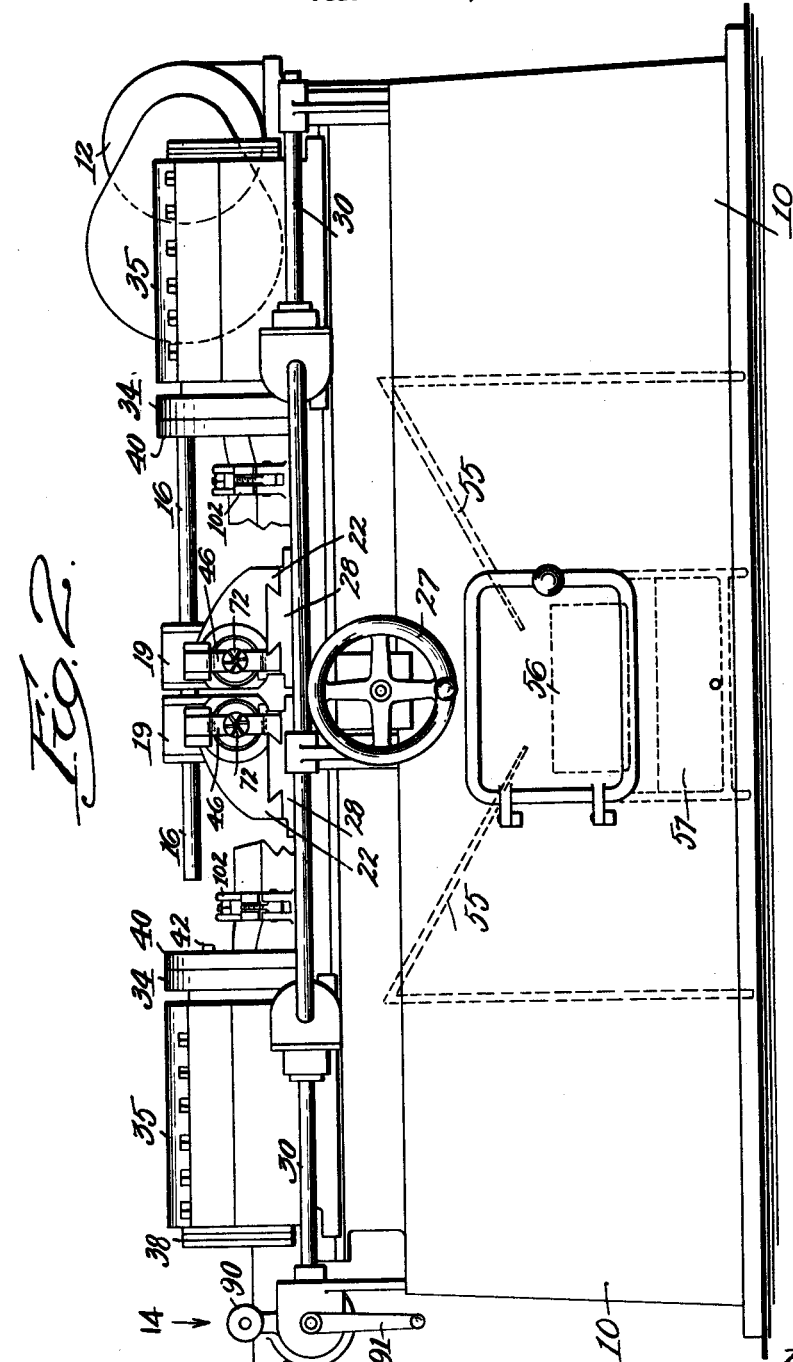

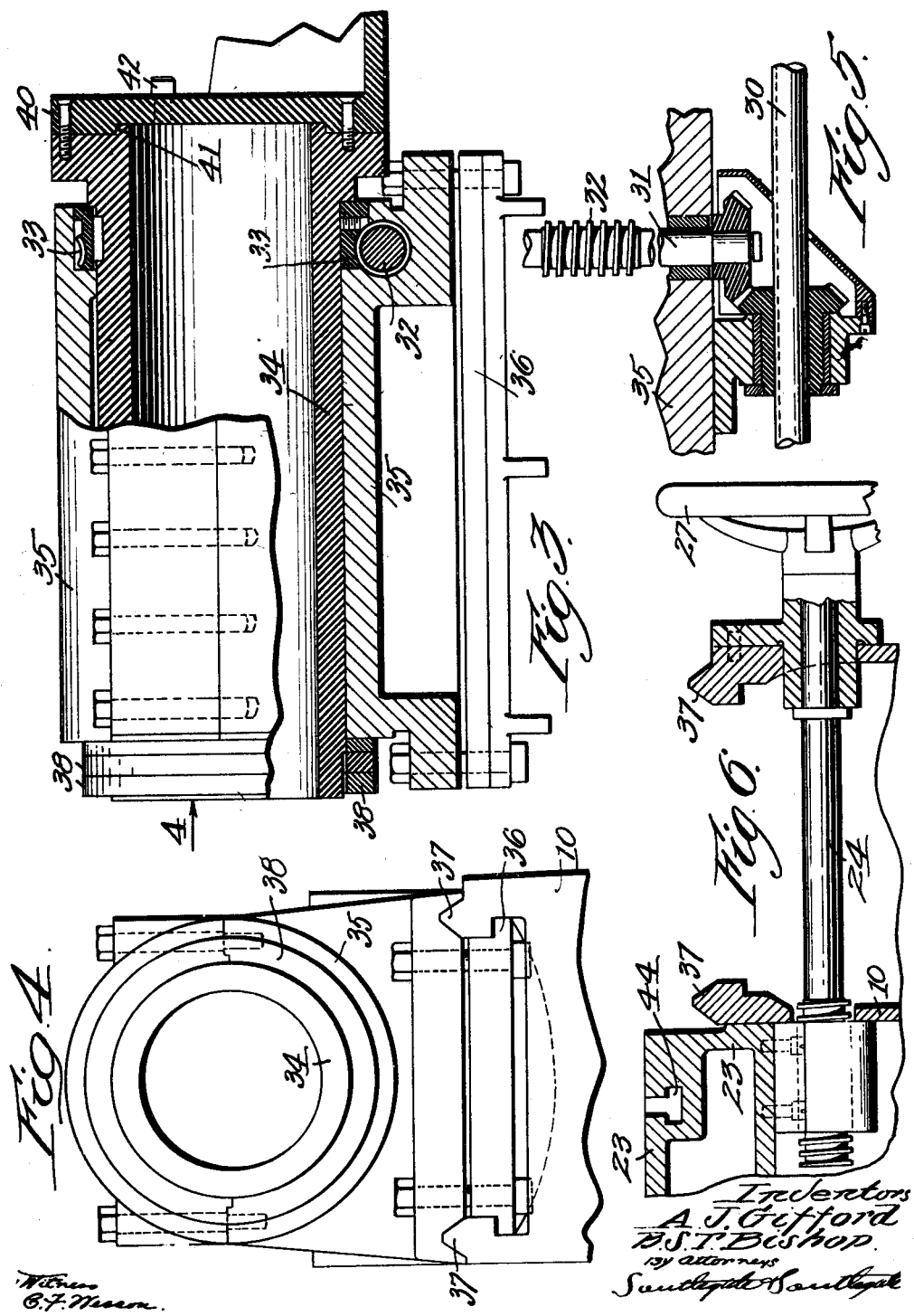

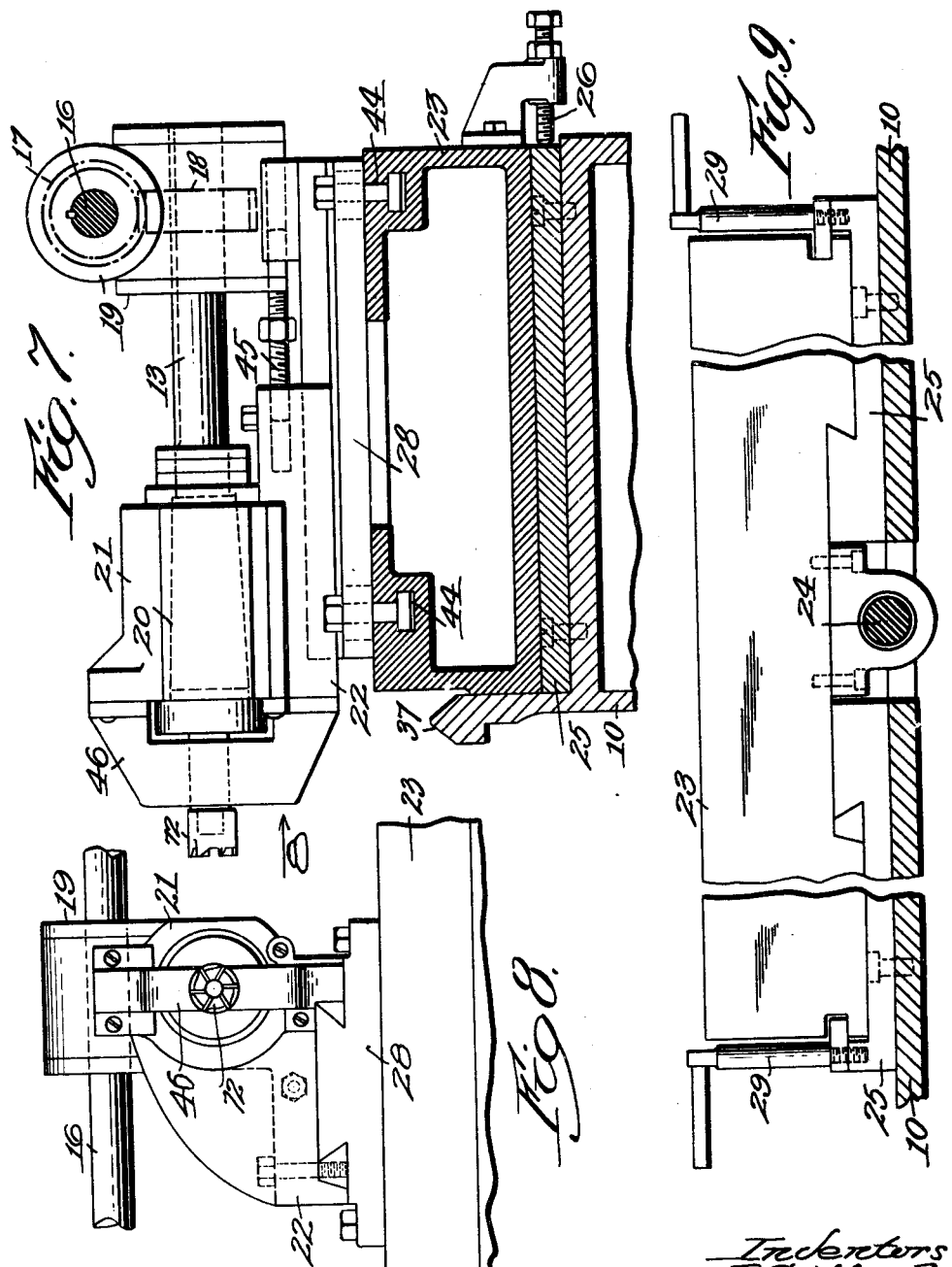

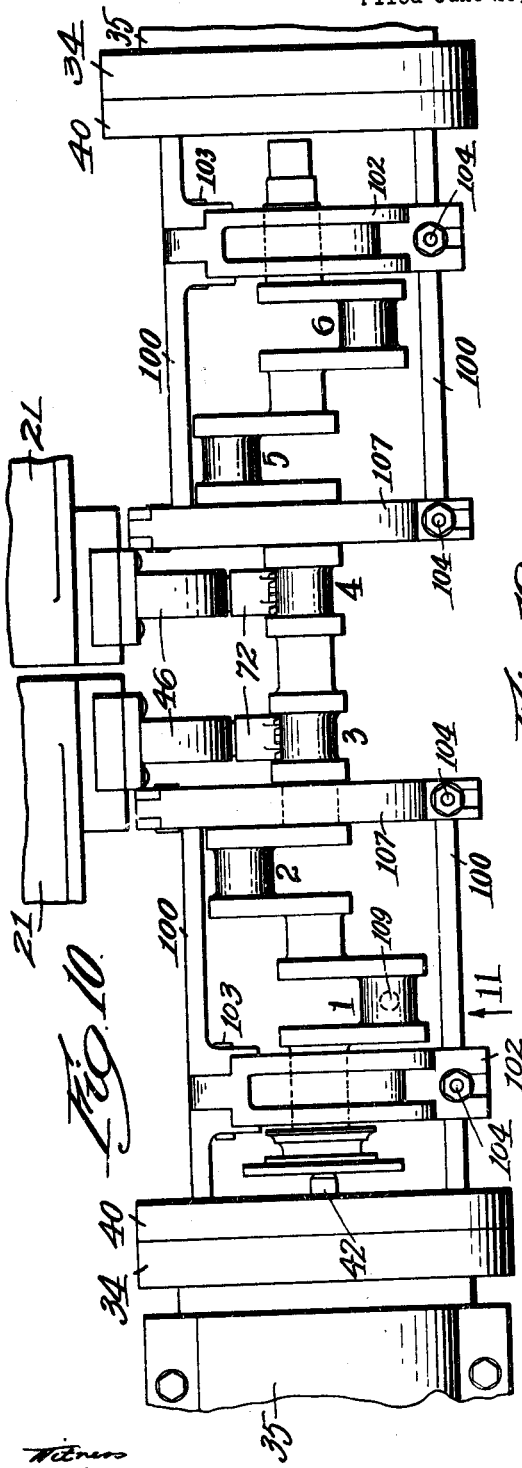

Patented July 17, 1928.

1,677,761

UNITED STATES PATENT OFFICE.

ALBERT J. GIFFORD, OF SHREWSBURY, AND BENJAMIN S. T. BISHOP, OF WORCESTER, MASSACHUSETTS, ASSIGNORS TO LELAND-GIFFORD COMPANY, OF WORCESTER, MASSACHUSETTS, A CORPORATION OF MASSACHUSETTS.

MACHINE FOR MILLING CRANK-SHAFT PINS.

Application filed June 25, 1924. Serial No. 722,403.

This invention relates to a machine adapted especially for milling the pins of a crank shaft. We use considerable of the mechanism that we have shown in our previous patent on a contour milling machine, No. 1,649,109, patented Nov. 15, 1927, and claim herein much of the mechanism that is common to the two cases but is not restricted to the milling of non-circular surfaces. To that extent this is a continuation of that case.

The principal objects of the invention are to provide suitable rotary supports for the ends of the crankshaft, suitable crankshaft holding crotches thereon and accurate locating means for setting the shaft in the right position on the supports; and to provide improved means for causing the reciprocation of the cutter spindles by hand for adjustment.

Other objects and advantages of the invention will appear hereinafter.

Reference is to be had to the accompanying drawings, in which

Fig. 1 is a plan of a crank shaft pin milling machine constructed in accordance with this invention, shown as supporting two milling cutter shafts for simultaneously milling two pins but long enough to permit of these cutters being arranged to mill any pair of pins on the shaft;

Fig. 2 is a front view of the same;

Fig. 3 is a central vertical section through one of the crankshaft supporting bearings on the line 3—3 of Fig. 1;

Fig. 4 is an end view of that bearing;

Fig. 5 is a sectional view through the driving elements for rotating the said support;

Fig. 6 is a sectional view of a part of the bed showing the hand wheel controlled mechanism for shifting the transverse tool slide;

Fig. 7 is a sectional view of the slide for supporting and operating a cutter spindle;

Fig. 8 is an end view of the same;

Fig. 9 is a side view of the supporting slide therefor with the main frame illustrated in section;

Fig. 10 is a plan of a crankshaft and the supporting parts showing the cutters in the act of milling two of the pins;

Fig. 11 is a front view of the holding crotch thereof;

Fig. 12 is an end view of the same;

Fig. 13 is a sectional view of the crankshaft through the pin being milled;

Figs. 14 and 15 are respectively a plan and end view of a construction for adjusting the work heads;

Fig. 16 is a central sectional view of the clutch; and

Fig. 17 is an end view of it.

We have shown the invention as applied to a machine long enough to mill the surfaces of any pair of pins of a crankshaft, but this machine as presented herewith is intended to mill only one pair of them. In fact, the method of operation is to mill one pair on one machine, then take the crankshaft out and put it into another machine exactly the same, except that the milling cutters are set at a different distance apart.

In this second machine, a second pair of pins are milled and then, if the crankshaft has six cranks, the shaft is transferred to a third machine exactly the same, except for the distance apart of the milling cutters, and the third pair of pins are milled off. It will be understood that this milling operation is performed around the circumferences of the pins and this machine is not constructed as shown for performing any other operation, although the principles set forth herein and even the details of construction are applicable for the milling of circumferences of other objects than crankshaft pins.

We have shown a bed or frame 10 for supporting all the parts. The top of this bed is divided into two regions, one extending along one side at the top for supporting the motors 11 and 12, the two tool spindles 13, for carrying the milling cutters 72 or other tools, and the mechanism for driving these spindles from the motor 12, as well as part of the mechanism for transmitting power from the motor 11 for driving the crankshaft to be operated upon. The other region at the top of the bed is designed for receiving the means for supporting and rotating the crankshaft to be operated upon.

The motor 12 drives the milling cutter spindles 13 through a pinion 14 on the motor shaft, suitable gearing 15 and shafts connected with and constantly driving a longitudinal shaft 16. To this shaft 16 are slidingly keyed a pair of spiral gears 17 each of which drives a gear 18 keyed slidingly to one of the cutter spindles. These spindles are supported in the following way:—On the frame 10 is fixed a slide plate 25 having ways arranged transversely. On these ways is a cross slide 23 adapted to be moved along the ways by a screw shaft 24 having a hand wheel 27 at the front of the machine. The slide is held in adjusted position by four binders 29 near its corners. The movement of the slide 23 forward is adjustably limited by an adjusting screw 26 on the slide and engaging the rear edge of the fixed slide plate 25.

In the upper surface of the cross slide 23 are a pair of longitudinal T-slots 44 having bolts extending down into them by which two supporting plates 28 are secured on the slide at any desired distance apart. These plates 28 have ways extending transversely of the machine on which are slidably mounted the two cutter slides 22. Each cutter slide has a rear hub 19 and a front hub 21 in transverse alignment in which the ends of one cutter spindle 13 are mounted. The front hub can be adjusted out and in by a right and left hand screw 45. The rear end of each spindle is mounted in ball bearings in the hub 19 which carries the spiral gear 17 and which can be moved along the shaft 16 to allow for the adjustment of the spindle 13 as desired. At the front end each of the spindles is provided with a cone 20 which has a bearing in a bushing located in an upwardly extending hub 21 on the slide 22. An overhanging spindle support 46 is provided on the end of the hub 21.

The motor 11 is connected by various gears, worms and shafts indicated by the numeral 30 at various points for driving two transverse shafts 31 on the front of the machine. These shafts are provided with worms 32 each meshing with a worm wheel 33 keyed to a hollow rotary spindle 34 formed in two semi-cylindrical parts bolted together. The upper one can be removed for cleaning and repairs. These spindles are mounted to face each other and rotate in heads 35 which are secured to the bed by shoes 36 and bolts or the like. The bed is provided with ways 37 which support the hubs 35 resting on these ways. These hubs 35 are adjusted longitudinally along these ways and then these heads are clamped up by the bolts to secure them firmly in their adjusted positions. A shoulder on the spindle 34 comes up against the gear 33 at one end and said spindle is provided with lock nuts and washers 38 at the other end for holding said shoulder firmly against the gear and preventing longitudinal motion in the head 35.

On the end of each spindle 34 is a flat plate 40 having a recess 41 in the back for fitting over a central projection on the spindle, so that this plate is centered. It is fixed to the head by screws or the like. Mounted on the front of this flat plate is an end stop 42 located at a distance off center. The plate is also provided with a holding and driving crotch 100. We prefer in this case to use one at both ends. The crotch itself is a trough-shaped body providing a hollow space for receiving the end of the crankshaft. This trough is a little less than semi-circular in extent, as indicated in Fig. 12. Across its top from one vertical edge to the other extends a clamp 102 pivoted at 103 to one side of the trough of the crotch. This is provided with a well known pivot bolt 104 on the other side for fastening the clamp down. The crotch is provided with a web across it under the clamp and with vertical walls 101. The clamp and will have semi-circular recesses in which are center plates 105 having their center at a distance from the center of revolution equal to the throw of the crankshaft. They have radial screws 106 for holding them so as to clamp the crankshaft spindle off center. At both ends they are removable and replaceable to receive the ends of crankshafts of different sizes and positively locating them in proper position with respect to the center of the spindle. A positioning stop 109 for one of the crankshaft pins is located in proper position on the crotch.

The crotch extends beyond this clamp and is provided at its end with another clamp 107 similarly located and arranged eccentrically and having a semi-circular shape inside to permit it to receive one of the concentric bearings of the crankshaft. It also has a pivot pin 103 and pivoted locking bolt 104. The end wall 101 of the crotch is provided with a semi-circular opening 108. These two eccentrically located semi-circular openings together form a circle for receiving the bearing of the crankshaft. This is designed as a centering plate and holds the crankshaft a little above the center of the tool 72 as indicated in Fig. 13.

It will be understood that the crankshaft is to be set by this crotch and locking means in such position that two pairs of pins, for example, those numbered 3 and 4 in Fig. 10 can be milled off around their circumferences.

This machine being designed to mill only two pairs of pins, the axis of the shaft itself will be set to rotate about the center axis of these two pins.

When the shaft is transferred to another machine, it is then set up so that it rotates about the center of another pair of pins.

It will be seen that the main slide 23 can be adjusted back and forth by hand as occasion may require by means of the hand wheel 27. The supporting plates 28 can be adjusted longitudinally to bring the cutters to the positions for milling the desired pins.

The motor 11 drives the spindles 34 through shafting and gearing 30 as stated but in the connections we have provided a worm 87 on one of the shafts 30 driving a corresponding worm wheel 88 which is loose on the next shaft of this series. A clutch 89 is slidingly keyed to the last-named shaft 30 and adapted to positively connect the worm wheel with that shaft. This clutch is ordinarily closed in practice.

Since the operation of this machine is necessarily slow, if it is necessary to turn the work through any considerable angle idly, it will consume considerable time. This clutch arrangement is provided to permit of the turning of the worm by hand as rapidly as desired at any time. In order to do this the clutch 89 is thrown out of engagement by means of the clutch rod and head 90. Thus the power is disconnected from the hub rotating mechanism and that mechanism can be operated by a handle 91 slidable on one of the shafts 30 and adapted to be positively connected with it by a pin and slot connection 92. Now the two spindles 34 can be rotated, either with the tools turning on their own axes through the connection of the motor 12, or not, as may be desired.

We have shown a receiver 55 for the oil and fine pieces of metal. It has a slanting bottom to direct them into a central wire receptacle 56. From this the cutting oil drains into the oil tank 57 from which it is pumped back into the machine.

When the crankshaft is inserted in the machine its end is butted against the stop 42 to locate it endwise.

The description of the operation of the machine has been given in connection with the several parts and it is sufficient to say that this machine is shown as set up to mill off the circumferences of the two pins 3 and 4 as shown in Fig. 10. These two pins are milled off in one revolution of the crankshaft, which is then removed and placed in another machine which will mill off the pins 2 and 5. It is then put into a third machine and the pins 1 and 6 are milled off. In each case the crankshaft is made to turn about a different center, as indicated in Fig. 13.

If it is desired to do all the work on one machine so that the shaft will not have to be taken out and put in another, three locating devices having different lengths will have to be used. For a large job it is not as economical to work in this way as it is with three machines but it can be done satisfactorily if the party has only one machine and is working on a comparatively small job.

Although we have illustrated and described only a single form of the invention we are aware of the fact that modifications can be made therein and that the invention can be used for the turning, milling or grinding of other circular shapes, and on devices other than crankshafts, without departing from the scope of the invention as expressed in the claims. Therefore we do not wish to be limited in these respects but what we do claim is:—

1. In a milling machine, the combination with a milling cutter spindle, of a bed for supporting it, said bed having a pair of longitudinal ways, a head mounted to slide on said ways, means for clamping the head to the ways, said head having a cylindrical passage therethrough, a spindle rotatably mounted in said passage, a gear on the spindle, means for rotating said gear to rotate the spindle, and means on the end of the spindle for locating an eccentric part of the work to be operated upon in a certain position around the circumference of the spindle, said spindle being provided with an eccentric fixed stop on the end thereof for engaging the end of the work for the purpose described.

2. In a milling machine, the combination with a milling cutter spindle adjustable transversely to its axis, of a bed for supporting it, a head mounted to slide on said bed, said head having a cylindrical passage therethrough, a spindle rotatably mounted in said passage, with its axis at right angles to the axis of the cutter spindle, a gear on the spindle, means for rotating said gear to rotate the spindle, said spindle being provided with an eccentric stop on the end thereof fixed in position along the axis of the spindle for engaging the end of the work for locating it lengthwise.

In testimony whereof we have hereunto affixed our signatures.

ALBERT J. GIFFORD.
BENJAMIN S. T. BISHOP.